Feb. 14, 1961 H. C. PARKER 2,971,737
SUPPORT FOR ELECTRICAL OUTLET BOX
Filed July 8, 1958 2 Sheets-Sheet 1
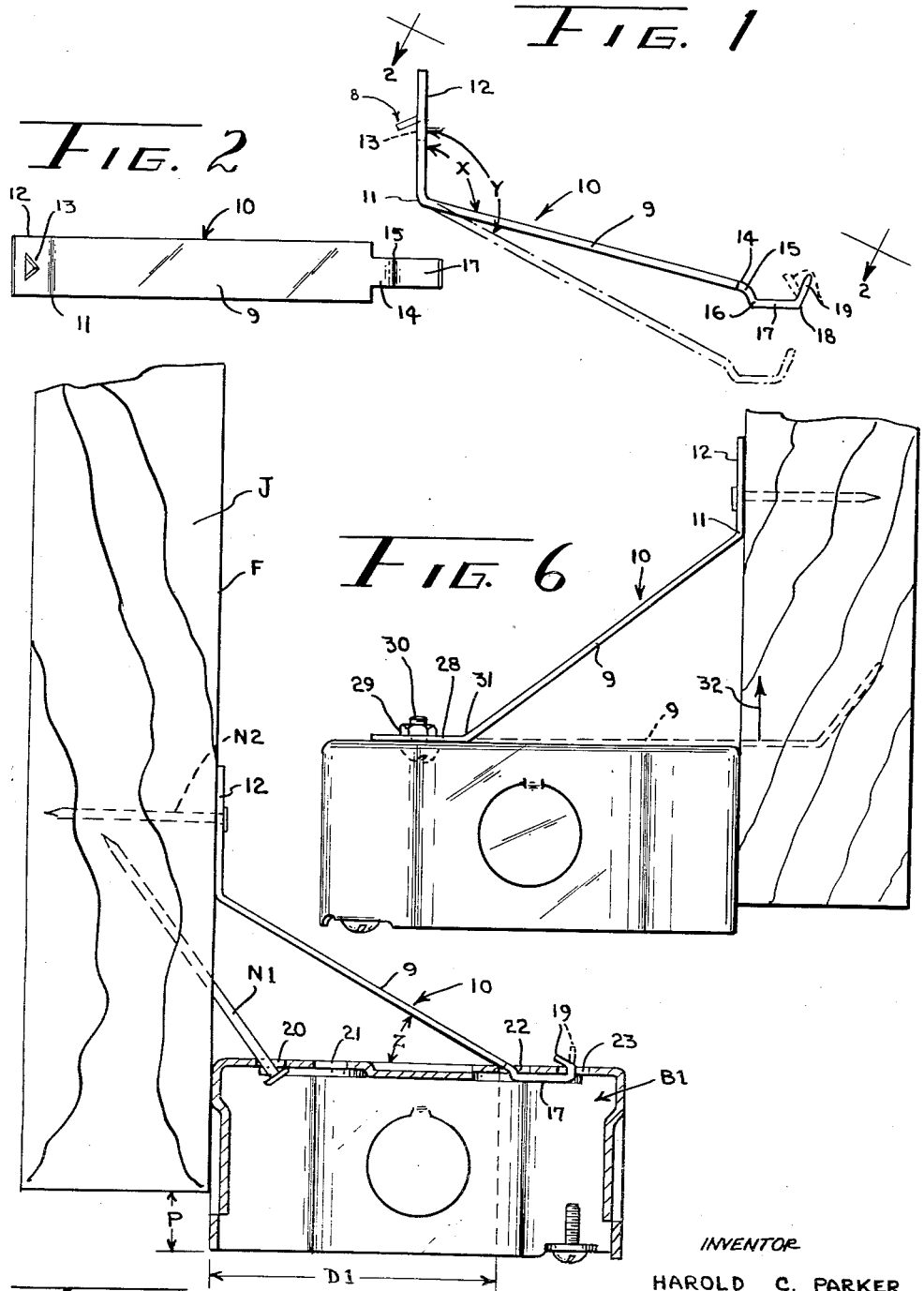
INVENTOR
HAROLD C. PARKER
BY Ralph L. Llugger
ATTORNEY

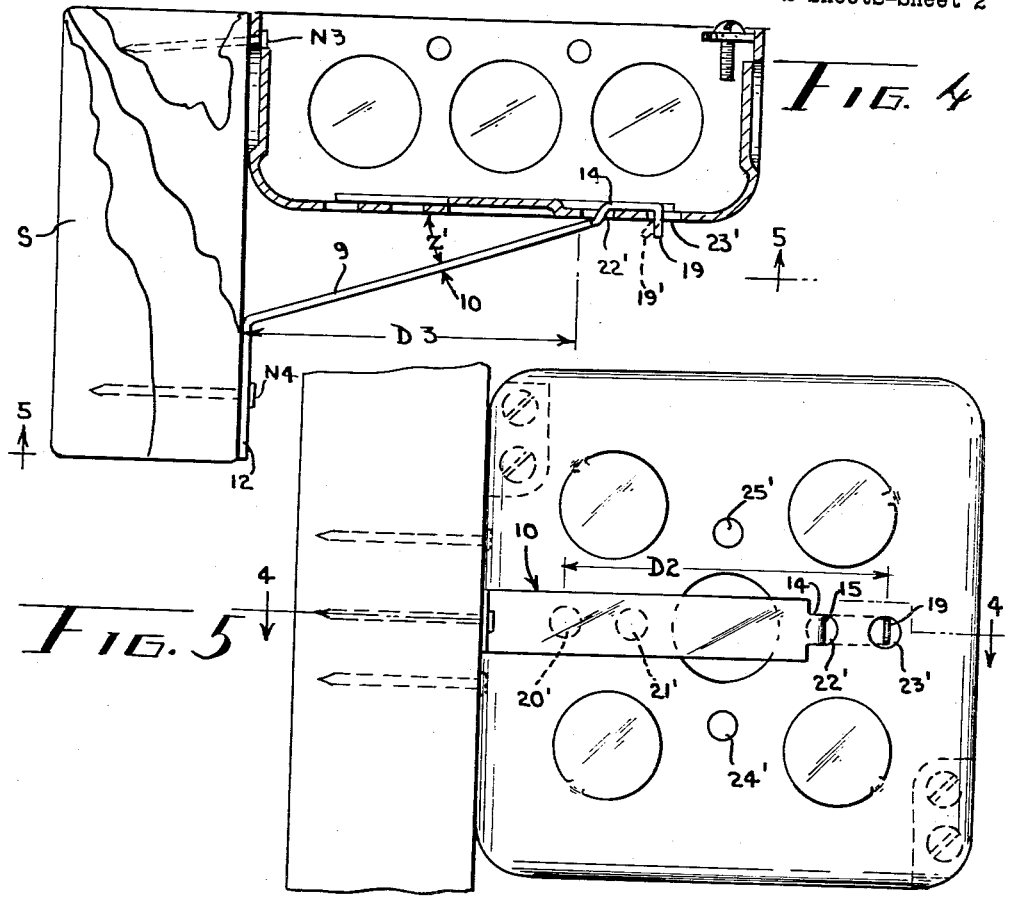

United States Patent Office 2,971,737
Patented Feb. 14, 1961

2,971,737
SUPPORT FOR ELECTRICAL OUTLET BOX
Harold C. Parker, 12108 Sunrise Lane, Hopkins, Minn.
Filed July 8, 1958, Ser. No. 747,294
4 Claims. (Cl. 248—205)

This invention relates to a device which may be used in conjunction with a standard electrical outlet box for supporting the box rigidly. The invention has for its purpose the provision of a support which is capable of being utilized with outlet boxes of standard construction, whereby such boxes may be braced rigidly with reference to structural members of the house or building in which the box is installed.

It is an object of this invention to provide a support for electrical outlet boxes and more particularly to provide a support for standard electrical outlet boxes of varying designs and shapes which may be installed by electricians without the necessity of using special tools. It is a further object of the invention to provide a heavy electrical outlet box support which may be made in large quantities at low price, and yet may be used with and attached to the box without modification of the box structure. It is a further object of the invention to provide a support for an electrical outlet box, of simple design, low manufacturing cost, and great rigidity which may be installed quickly and effectively to provide a rigid support for an electrical outlet box.

Other and further objects are those inherent in the invention herein illustrated, described, and claimed, and will be apparent as the description proceeds.

To the accomplishment of the foregoing and related ends, this invention then comprises the features hereinafter fully described and particularly pointed out in the claims, the following descriptions setting forth in detail certain illustrative embodiments of the invention, these being indicative, however, of but a few of the various ways in which the principles of the invention may be employed.

The invention is illustrated with reference to the drawings wherein:

Figure 1 is a side elevational view of the support for electrical outlet box, which is the subject of this invention;

Figure 2 is a plan view taken in the direction of arrows 2—2 of Figure 1, showing another view of the support for electrical outlet box which is the subject of this invention;

Figure 3 is a vertical sectional view through the ceiling joist, and a standard #8B octagonal outlet box showing the support for said outlet box of the present invention installed thereon and the box attached to the ceiling joist;

Figure 4 is a horizontal sectional view through the vertical wood studding illustrating a standard #1900 square outlet box of the studding for bracing the box;

Figure 5 is a rear elevational view of the outlet box shown in Figure 4, taken along the line and in the direction of arrows 5—5 of Figure 4;

Figure 6 illustrates a modified form of the invention showing the support for electrical outlet box attached to the box, and the box and support fastened to a ceiling joist or studding.

Referring to Figures 1 and 2, the outlet box support of the present invention comprises a brace generally designated 10 which has a bend at 11 so as to provide a fastening area 12. The fastening area is provided with an aperture 13 through which a fastening nail or screw may be placed to hold the support to any suitable structural member such as a joist or studding of a building, when the support is in place to be used to support an outlet box. The aperture 13 may be formed by punching out triangular projection 8 such that one side of the projection forms an angle of approximately 90° with the fastening area and remains integral therewith. By placing the fastening area against a support and hitting it with a hammer, the projection will hold the brace in place until a more permanent fastening means is placed through the aperture.

At the opposite end of the brace piece 10, the strip is narrowed to form a tongue 14, as shown in Figure 2, and this tongue is provided with bends 15 and 16, so as to provide the offset extension 17, which is in turn bent at 18 to provide the terminal end 19. The distance between the bends 15 and 16 is sufficient so that when the inside of the bend 15 rests against the back of an outlet box as shown in Figures 3 and 4, the portion between the bends 15 and 16 will be long enough to extend through an aperture 22 which is one of the standard apertures 20—25 punched in the rear (or bottom) surface of a standard #8B octagonal outlet box. It will be noted that the apertures 20 and 21 and the apertures 22 and 23 form related pairs and the spaces between such related pairs of apertures are standardized in the industry. Advantage is taken of this circumstance to provide for entrance of the tongue portion of the brace through the aperture 22 (or 21). When the tongue is thus placed through the aperture, the offset portions 17 of the tongue will lie against the inner surface of the bottom of the box, and the terminal end 19 of the tongue will under such circumstances go through the aperture 23 (or the aperture 20). After the tongue 14 is thus threaded through the aperture 23 (or the aperture 20 depending upon which way the brace is set), the terminal end 19 is given a sharp blow with a hammer and is bent over to the full line position as shown in Figure 3, or as shown in the dotted line position in Figure 4.

Figure 4 illustrates the manner in which the terminal end 14 of the tongue is entered into the appropriate aperture of the box, as previously described, but before the terminal end 19 has been bent over, whereas Figure 3 illustrates the position of the terminal end 19 after it has been bent over. The box, which is generally designated B, is attached by one long nail N1 that extends through the aperture nearest the joist or studding, which in Figure 3 is the aperture 20. Prior to this invention, it has been necessary for electricians to provide a wood brace extending across from joist to joist, or studding to studding, to provide necessary stability or rigidity of the box.

According to this invention, the outlet box support 10 is fastened to the box as previously described and the nail N1 is placed so as to provide any desired amount of projection of the front edge of the box, as shown by the dimension P in Figure 3. The front edge is projected beyond the joist so that the front edge of the box is level or nearly so with the plaster or other finish that is attached to the studding or ceiling joist. Next the box B is adjusted for proper right angularity with reference to the face F of the joist J and the nail N2 is then placed, accordingly fastening the portion 12 of the brace 10 firmly as a diagonal support reaching from the joist J to the box B1 as shown in Figure 3.

In Figures 4 and 5, the brace 10 is illustrated as installed with a standard #1900 square box to aid in securing the box in place on the studding S. This standard square box, has bottom apertures 20'—25' which are arranged in the same pattern as the pattern of apertures for a standard #8B octagonal box as shown in Figure 3, except that the dimension between the outermost holes 20' and 23', as illustrated by the dimension arrow $D_2$ in Figure 5 is somewhat larger than the dimension between the corresponding holes 20 and 23 of the octagonal box shown in Figure 3. This circumstance, however, does not change the usefulness of one size of brace 10. The tongue 14 of the brace is entered through the aperture 22' and returned through the aperture 23' in exactly the same way as illustrated with reference to Figure 3 and is clinched over to the dotted line position 19' as shown in Figure 4 for attaching the tongue firmly to the two apertures 22' and 23'. However, because the distance from the aperture 22' to the face of the box which is nailed to the studding S, as shown by the dimension $D_3$, is in this instance somewhat greater than the corresponding dimension $D_1$ as shown in Figure 3, the entire brace 10 will have a lesser angle at Z' between the brace and the back surface of the box, than as illustrated at Z in Figure 3. The angularity between the portion 12 of the brace and the main body portion 9 of the brace is originally manufactured to provide the angle X, as shown in Figure 1, so as to accommodate the fitting of the brace to the larger size #1900 square box. When the brace is thus installed in such a box, it is only necessary to enter the tongue 14 and twist the end 19 as previously described, and the box plus brace assembly is then ready to be nailed to the studding or joist by means of the nails $N_3$ and $N_4$ as shown in Figure 4. However, when installing the brace in a smaller size box as shown in Figure 3, the electrician simply bends the end portion 12 of the brace slightly so as to increase the angle X as shown in Figure 1, to the slightly larger angle Y, and the brace is then attached to the box as shown in Figure 3, the end is clinched and the assembly of box and brace are ready to be attached as previously described, by setting the nails $N_1$ and $N_2$ in appropriate positions.

Accordingly, while the brace provides great rigidity, by making it of material capable of being bent slightly at the bend 11, it is possible to adapt the brace to a wide variety of box dimensions, within physical limits of the brace. Similarly by having the tongue 14 sufficiently narrow, it may be entered in through the standard apertures of the box, and by merely bending over the tip 19, the brace is sufficiently attached so as to provide an exceedingly strong support.

In Figure 6, there is illustrated another form of brace that is the same as shown in Figures 1 and 2, except that the portion 14—19 is replaced by a flat portion 28. The flat portion is suitably apertured at 29, and bent slightly with reference to the portion 9, so that said portion 28 may be fastened through the rear (or bottom) portion of the box, by means of a screw, rivet, or other suitable fastening 30. If desired, the entire brace structure 10 may be spot-welded to the bottom surface of the box, with the brace portion 9 originally in the position shown in dotted lines in Figure 6. By manufacturing the brace with a simple line of compression at 31, and then fastening it to the box, the electrician has only to pull the brace portion in the direction of arrow 32, and it will bend at the line 31, so as to provide the desired angularity as shown for the full line portion 9 of the brace, in Figure 6. This may be achieved without any substantial bowing of the portion 9, providing all the columnar rigidity needed for the brace structure.

As many widely apparently different embodiments of this invention may be made without departing from the spirit and scope thereof, it is to be understood that I do not limit myself to the specific embodiments herein.

What I claim is:

1. In combination with an outlet box having spaced apertures in the bottom surface, a support for mounting said box comprising a metal strut having an end portion bent with reference to the length of the strut, the bent portion of said strut extending through an aperture in the bottom of the box and along the interior surface of the bottom of the box, the other end portion of the strut also being bent with reference to the length of the strut to form a fastening area for securing the strut to a portion of a structure on which the outlet box is mounted, said fastening area forming an angle with reference to the length of the strut so that when the length of the strut is at an angle to the bottom of the box, and the end portion within the box is against the interior of the bottom surface of the box the fastening area extends against a portion of said structure on which the outlet box is mounted.

2. The combination of outlet box and support as described in claim 1 in which the bent end portion of the support which extends through an aperture in the bottom of the box also extends along the inner surface of the bottom of the box to a position overlying an adjacent aperture in the bottom surface of said box and in which said bent end portion has a bent terminal end and extends outwardly through said adjacent aperture in the bottom surface of said box.

3. The combination of outlet box and support as described in claim 2 in which said terminal end has sufficient length and is sufficiently bendable so that it may be clinched over the edge of the adjacent aperture for fastening said support to the box by means of said apertures.

4. The combination of an outlet box and support as described in claim 1 in which the bent portion of the strut which extends through the aperture in the bottom of the box is less in width than the balance of the metal strut, thereby forming a shoulder which rests against the bottom of the box adjacent the aperture into which the end portion of the strut extends.

References Cited in the file of this patent

UNITED STATES PATENTS

| | | |
|---|---|---|
| 1,063,783 | Donovan | June 3, 1913 |
| 1,365,296 | Wirth | Jan. 11, 1921 |
| 2,429,443 | Yeschick | Oct. 21, 1947 |
| 2,570,731 | Susnow | Oct. 9, 1951 |
| 2,802,634 | Everett | Aug. 13, 1957 |